United States Patent [19]

Komoto

[11] Patent Number: 4,564,264

[45] Date of Patent: Jan. 14, 1986

[54] FLOATING LENS EXTENDING MECHANISM

[75] Inventor: Shinsuke Komoto, Tokyo, Japan

[73] Assignee: Asahi Kogaku Kogyo Kabushiki Kaisha, Tokyo, Japan

[21] Appl. No.: 536,084

[22] Filed: Sep. 27, 1983

[30] Foreign Application Priority Data

Sep. 27, 1982 [JP] Japan ............... 57-146133[U]

[51] Int. Cl.$^4$ ............................................. G02B 7/10
[52] U.S. Cl. .................................................. 350/255
[58] Field of Search ........................ 350/255, 429-430

[56] References Cited

U.S. PATENT DOCUMENTS

| | | | |
|---|---|---|---|
| 2,537,561 | 1/1951 | Waitt | 350/429 |
| 3,915,557 | 10/1975 | Shimojima | 350/255 |
| 4,309,076 | 1/1982 | Ito | 350/255 |
| 4,405,205 | 9/1983 | Rossmann | 350/255 |

FOREIGN PATENT DOCUMENTS 45330  4/1977  Japan ................................. 350/430

*Primary Examiner*—William H. Punter
*Attorney, Agent, or Firm*—Sughrue, Mion, Zinn, Macpeak & Seas

[57] ABSTRACT

A mechanism for extending a floating lens includes a rear group helicoid ring integral with a distance ring and supported rotatably on a stationary ring. A rear group lens frame which is threadably engaged with the rear group helicoid ring is guided for straight line movement as the rear group helicoid ring turns. A front group helicoid ring is rotatably supported on the rear group lens frame and a front group lens frame which is threadably engaged with the front group helicoid ring is guided for straight line movement as the front group helicoid ring turns. A guide plate is disposed outside the front group helicoid ring and is fixedly secured to the stationary ring. The guide plate is provided with a straight guide groove for guiding the rear group lens frame and a curved groove. A guide roller integral with the front group helicoid ring is engaged in the curved groove for turning the front group helicoid ring as the front group helicoid ring is moved back and forth with the rear group lens frame.

3 Claims, 5 Drawing Figures

FLOATING LENS EXTENDING MECHANISM

BACKGROUND OF THE INVENTION

The present invention relates to floating lenses, and more particularly to a floating lens extending mechanism in which the front and rear lens systems are moved relative to each other for short distance aberration compensation.

In general, the performance of a lens is lowered when a close focusing distance is taken with the lens system extended. This phenomenon is significant especially with a macro lens which can make a close shot. In order to overcome this difficulty, there have been proposed a variety of floating lenses which are so designed that the lens system is divided into front and rear lens groups, and in association with the extension of the lens, these lens groups are moved relative to each other for compensating for the aberration, so that the performance of the lens is maintained satisfactorily even when a close shot is made.

In the floating lens, fundamentally the rear lens group (hereinafter referred to as a "rear group lens", for convenience in description) is moved straight back and forth by rotation of a helicoid ring similar to the ordinary lens, and the front lens group (hereinafter referred to as "a front group lens", for convenience in description) is moved straight back and forth by rotation of the front group helicoid ring which is rotatably supported on the rear group lens frame. Therefore, the rear group lens and the front group lens can be individually moved by rotation of the respective helicoid rings according to the leads thereof (and the thread pitches of the helicoid rings with respect to the supporting members thereof), and accordingly the close focusing distance compensation can be made by suitably setting the leads (and the thread pitches). On the other hand, the conventional lens is so designed that the front and rear group helicoid rings are made integral with each other with an engaging member so as to be turned by the distance ring. Accordingly a lens such as a macro lens, the amount of extension of which is relatively large, suffers from the following difficulty: In the case where the amount of extension is large, it is necessary to increase the length of the distance ring in order to maintain the distance ring engaged with the front (or rear) group helicoid ring, or to use double helicoid threads to extend the distance ring itself. However, the former method cannot satisfy the requirement for miniaturizing the lens because the total length of the lens is necessarily increased, and the latter method suffers from an operational difficulty in that the distance ring is displaced.

In the above-described conventional extending mechanism, the loci of the front and rear group lenses with respect to the angle of rotation of the distance ring are linear, and accordingly only linear compensation is carried out according to the leads (and the pitches). However, in many cases it is desirable that the close focusing distance compensation of a lens system be a non-linear one, and in the above-described conventional extending mechanism the non-linear close focusing distance compensation is merely replaced by a linear one approximated thereto.

SUMMARY OF THE INVENTION

In view of the foregoing, an object of the present invention is to provide a lens extending mechanism in which not only linear compensation but also non-linear compensation can be made without displacing the distance ring and which is small in size. The principal feature of the mechanism resides in that the front group helicoid ring supported rotatably on the rear group lens frame is not turned directly by the distance ring but is turned by the longitudinal movement of the front group helicoid ring through the engagement of a floating groove in a guide plate fixedly secured to a stationary ring with a guide roller integral with the front group helicoid ring, so that the front group lens is moved relative to the rear group lens.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

Figure 1:
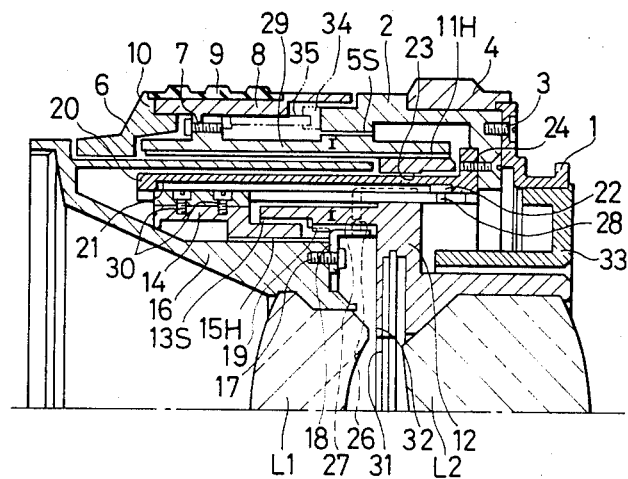
FIG. 1 is a longitudinal sectional view showing the upper half of one example of a floating lens extending mechanism according to the present invention.

The present invention will be described with reference to its preferred embodiment. In FIG. 1, a lens mount 1 mounted on a camera body is integrally coupled to a stationary ring 2 with small screws 3. An aperture ring 4 is rotatably supported on the outer surface of the stationary ring 2, and a rear group helicoid ring 6 is rotatably supported on the inner surface of the stationary ring 2 through threads 5S. The rear group helicoid ring 6 is integrally connected to a distance ring 8 with small screws 7. The distance ring 8 is integral with a rubber ring 9 and a decoration ring 10. These parts integral with the distance ring 8 are rotatable.

The rear group helicoid ring 6 is threadably engaged with a rear group lens frame 12 through helicoid threads 11H cut in their surfaces. The rear group lens frame 12 holds a rear group lens L2. A guide mechanism (described later) prevents the frame 12 from turning, so that the frame 12 moves straight back and forth in the direction of the optical axis. That is, the frame is moved straight back and forth as the rear group helicoid ring 6 turns. A front group helicoid ring 14 is rotatably supported on the front end portion of the rear group lens frame 12 through threads 13S, and is threadably engaged with a front group lens frame 16 through helicoid threads 15H. The front group lens frame 16 holds a front group lens L1. Since a guide key 18 secured fixedly to the rear end portion of the frame 16 with a small screw 17 is inserted into the straight movement guide groove 19 of the front group lens frame 16, the frame 16 can only move straight back and forth. That is, the frame 16 is moved in the direction of the optical axis as the front group helicoid ring 14 is turned.

Figure 2:
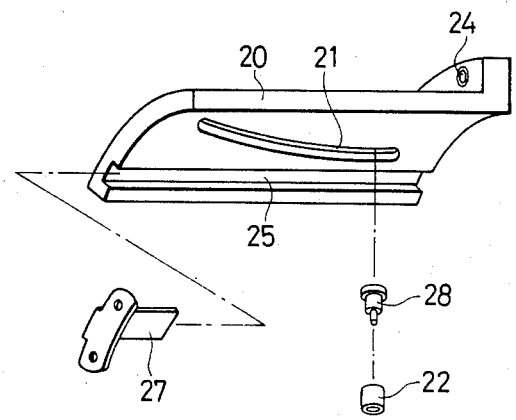
FIG. 2 is a perspective view showing a guide plate in FIG. 1.

A specific feature of the present invention resides in that rotation of the front group helicoid ring 14 is controlled by engagement of a guide roller 22, integral with the front group helicoid ring 14, with a floating groove 21 cut in a guide plate 20. The guide plate 20 is shown in FIG. 2 in more detail. The guide plate 20 is positioned outside the front group helicoid ring 14. More specifically, it is inserted into a through-hole 23 cut in the rear group lens frame 12 and is fixedly secured to the stationary ring 2 by means of a screw secured in a tapped hole 24.

Figure 3:
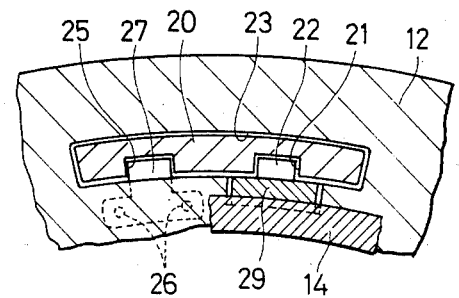
FIG. 3 is a sectional view taken along line III—III in FIG. 1, showing the essential components.
Figure 4:
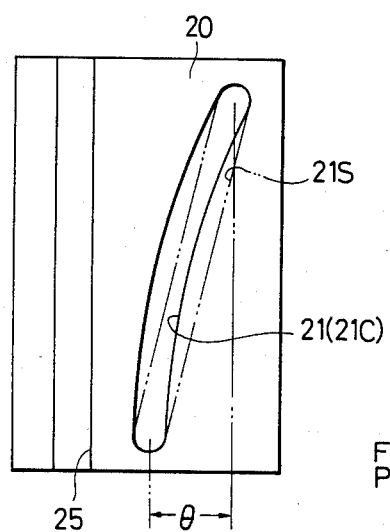
FIG. 4 is an unfolded view showing a groove and a straight movement guide groove in FIG. 1.
Figure 5:
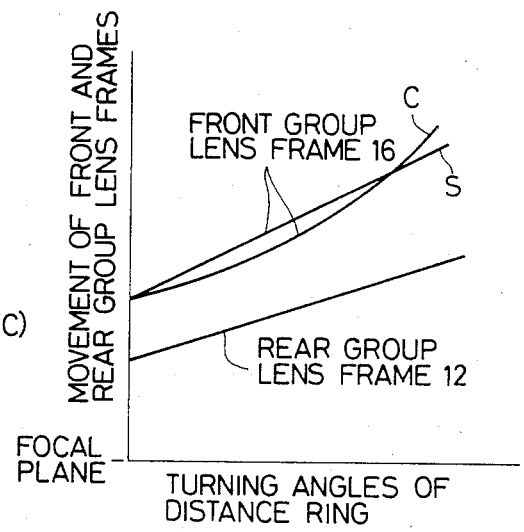
FIG. 5 is a graphical representation showing examples of the loci of a front group lens and a rear group lens.

In FIG. 3, the aforementioned floating groove 21 and a guide groove 25 for straight movement of the rear group lens frame 12 are cut in the inner surface of the guide plate 20. A guide key 27 which is fixedly secured to the rear group lens frame 12 is fitted in the guide groove 25. The roller 22 fitted in the floating groove 21 is rotatably supported on a roller supporting rod 29 with a supporting screw 28. The roller supporting rod 29 is fixedly secured to the front group helicoid ring 14 with small screws 30, as shown in FIG. 1.

In FIG. 1, reference numeral 31 designates aperture blades and reference numeral 32 designates a ring for operating the aperture blades 31, the operating ring 32 being operated in association with the aperture ring 4 by a conventional mechanism. A light shielding ring 33 is provided for preventing the leakage of light. The range of rotation of the distance ring 8 from infinite distance to shortest distance is determined by a stopper pin 34 embedded in the stationary ring 2 and a stopper plate 35 fixedly secured to the distance ring 8.

The lens extending mechanism according to the utility model is constructed as described above. Accordingly, as the rotary members such as the distance ring 8 and the rear group helicoid ring 6 are turned with the rubber ring 9, the rear group lens frame 12 is extended according to the lead of the helicoid threads 11H. At the same time, the rear group helicoid ring 6 is moved according to the pitch of the threads 5S. Accordingly, strictly stated, the amount of movement of the rear group lens frame 12 is the composition of the lead of the helicoid threads 11H and the pitch of the threads 5S. However, since the pitch of the threads 5S is generally not more than 1.0 mm, the distance ring 8 is smoothly moved. As the rear group lens frame 12 is extended along a straight line by means of the straight movement guide groove 25 in the guide plate 20 and the guide key 27 engaged with the guide groove 25, both the front group helicoid ring 14 engaged with the rear group lens frame 12 through the threads 13S and the front group lens frame 16 is as indicated by the curve C. In this case, non-linear aberration compensation can be carried out. In the case where the floating groove 21 is a straight cam groove 21S, the locus is as indicated by the straight line S. In this case, linear compensation can be carried out. The amount of movement of the front group lens frame 16 relative to the rear group lens frame 12 can be determined by setting the lead of the helicoid threads 15H and the pitch of the threads 13S (including reversing the directions of the threads).

The threads 13S and 5S are means for rotatably supporting the front group helicoid ring 14 and the rear group helicoid ring 6 respectively on the rear group lens frame 12 and the stationary ring 2, and accordingly, they may be purely rotatably supported without using the threads. In the above-described embodiment, as the straight movement guide groove 25 for the rear group lens frame 12 is formed in the guide plate 20, the relation between the guide groove 25 and the floating groove 21 can be advantageously be acknowledged. However, the rear group lens frame 12 may be moved straight by another part. For instance, the engagement of the guide plate 20 with the through-hole 23 may be employed as straight movement guide means.

With the floating lens extending mechanism according to the present invention, the linear or non-linear short distance compensation can be carried out as desired depending on the configuration of the floating groove formed in the guide plate. Accordingly, a floating lens higher in accuracy can be provided according to the present invention. The distance ring is integral with the rear group helicoid ring, but it is not directly coupled to the front group helicoid ring. Therefore, the length of the distance ring may be decreased for miniaturization of the mechanism. Furthermore, as the distance ring is turned substantially at the fixed position, the operability is similar to that of the ordinary lens which is extended as one unit.

While the invention has been particularly shown and described with reference to a preferred embodiment thereof, it will be understood by those in the art that the foregoing and other changes in form and details may be made therein without departing from the spirit and scope of the invention.

What is claimed is:

1. A mechanism for extending a floating lens comprising a stationary ring, a rear group helicoid ring rotatnected to said rear group lens frame and located in said straight guide groove for guiding said rear group lens frame along a straight line.

3. A mechanism as set forth in claim 1 wherein said second guide means is comprised of a straight guide groove in said second group lens frame and a guide member connected to said first group lens frame and located in said straight guide groove for guiding said first group lens frame along a straight line.

* * * * *